(12) United States Patent
Pocock

(10) Patent No.: US 7,574,721 B2
(45) Date of Patent: Aug. 11, 2009

(54) APPARATUS AND METHOD TO GENERATE AND ACCESS BROADCAST INFORMATION

(76) Inventor: Michael Pocock, 485 Queens Avenue, London, Ontario (CA) N6B 1Y3

(*) Notice: Subject to any disclaimer, the term of this patent is extended or adjusted under 35 U.S.C. 154(b) by 511 days.

(21) Appl. No.: 09/965,808

(22) Filed: Oct. 1, 2001

(65) Prior Publication Data

US 2002/0023272 A1 Feb. 21, 2002

Related U.S. Application Data

(63) Continuation of application No. 08/916,099, filed on Aug. 21, 1997, now Pat. No. 6,314,577, which is a continuation of application No. 08/329,837, filed on Oct. 27, 1994, now Pat. No. 5,661,787.

(51) Int. Cl.
*H04N 7/173* (2006.01)
*H04M 1/00* (2006.01)
*H04N 7/16* (2006.01)

(52) U.S. Cl. .................... 725/52; 725/53; 725/115; 725/116; 707/2; 707/3; 455/154.1; 455/158.1

(58) Field of Classification Search .................. 455/45, 455/154.1, 158.1; 725/38, 45, 115, 52, 53, 725/116; 707/2, 3
See application file for complete search history.

(56) References Cited

U.S. PATENT DOCUMENTS

| | | | |
|---|---|---|---|
| 4,071,698 A | 1/1978 | Barger, Jr. et al. | |
| 4,320,256 A | 3/1982 | Freeman | |
| 4,393,277 A | 7/1983 | Besen et al. | |
| 4,506,387 A | 3/1985 | Walter | |
| 4,710,955 A | 12/1987 | Kauffman | |
| 4,757,267 A | 7/1988 | Riskin | |
| 4,785,408 A | 11/1988 | Britton et al. | |
| 4,789,863 A | 12/1988 | Bush | |
| 4,876,592 A | 10/1989 | Von Kohorn | |
| 4,905,094 A | 2/1990 | Pocock et al. | |
| 4,926,255 A | 5/1990 | Von Kohorn | |
| 4,947,028 A | 8/1990 | Gorog | |
| 5,001,745 A | 3/1991 | Pollock | |
| 5,023,904 A * | 6/1991 | Kaplan et al. | 379/91.02 |
| 5,113,496 A | 5/1992 | McCalley et al. | |
| 5,136,636 A * | 8/1992 | Wegrzynowicz | 379/221.01 |
| 5,151,782 A | 9/1992 | Ferraro | |
| 5,163,087 A * | 11/1992 | Kaplan | 379/93.03 |
| 5,182,705 A | 1/1993 | Barr et al. | |

(Continued)

FOREIGN PATENT DOCUMENTS

EP 0217308 A2 4/1998

*Primary Examiner*—Christopher Kelley
*Assistant Examiner*—Reuben M Brown
(74) *Attorney, Agent, or Firm*—Jefferson IP Law, LLP; Raymond B. Persino

(57) ABSTRACT

The system enables listeners and viewers of a broadcast to access additional information associated with a broadcast. Listeners and viewers utilize a user device to connect to a database containing program descriptions (e.g. audio, text, video or combination thereof) further describing the programming and ancillary information. The database is indexed by the broadcast's program list or schedule thereby allowing a user of the system to search and select a particular program description of interest. Hearing or viewing program descriptions enables users to preview excerpts and review a broadcast before purchasing an item heard or viewed on a broadcast.

35 Claims, 7 Drawing Sheets

U.S. PATENT DOCUMENTS

| | | |
|---|---|---|
| 5,233,654 A | 8/1993 | Harvey et al. |
| 5,237,628 A | 8/1993 | Levitan |
| 5,280,642 A * | 1/1994 | Hirata et al. .............. 455/186.1 |
| 5,303,401 A * | 4/1994 | Duckeck et al. .......... 455/186.1 |
| 5,337,347 A | 8/1994 | Halstead-Nussloch et al. |
| 5,359,419 A | 10/1994 | Kawasaki |
| 5,393,713 A * | 2/1995 | Schwob .................. 455/158.5 |
| 5,457,739 A | 10/1995 | Le Cheviller |
| 5,485,197 A | 1/1996 | Hoarty |
| 5,495,608 A * | 2/1996 | Antoshenkov ................. 707/3 |
| 5,539,635 A * | 7/1996 | Larson, Jr. ................... 700/234 |
| 5,561,704 A * | 10/1996 | Salimando ............... 455/456.5 |
| 5,592,551 A | 1/1997 | Lett et al. |
| 5,635,978 A | 6/1997 | Alten et al. |
| 5,664,184 A * | 9/1997 | Ferguson et al. ........ 707/103 R |
| 5,666,528 A * | 9/1997 | Thai ........................... 707/102 |
| 5,703,795 A | 12/1997 | Mankovitz |
| 5,734,961 A | 3/1998 | Castille |
| 5,809,246 A | 9/1998 | Goldman |
| 5,953,046 A | 9/1999 | Pocock |
| 6,161,102 A * | 12/2000 | Yanagihara et al. ............ 707/3 |

* cited by examiner

FIG. 2

| FIELD # | 2000 ① | 2005 ② | 2010 ③ | 2015 ④ | 2020 ⑤ | 2025 ⑥ | 2030 ⑦ | 2035 ⑧ |
|---|---|---|---|---|---|---|---|---|
| | 9728 | 80694 | 176 | O01 | O32406 | | | 9064 |
| | | | | O02 | O32710 | | | 9123 |

↑ NEXT MUSIC PIECE BROADCAST

FIG. 4

| FIELD # | 4000 ① | 4010 ② | 4020 ③ | 4030 ④ | 4040 ⑤ | 4050 ⑥ | 4060 ⑦ | NEXT STATION IN AREA AND EXCHANGE CODE ④ ⑤ ⑥ ⑦ | LAST STATION ④ ⑤ ⑥ ⑦ |
|---|---|---|---|---|---|---|---|---|---|
| | 123 | 306 | 3 | 9728 | 1 | 3 | 49062 | | |
| | 123 | 309 | 2 | | | | | | |
| | 123 | 322 | 5 | | | | | | FIFTH STATION |
| | 123 | 338 | 2 | | | | | | |

FIG. 6
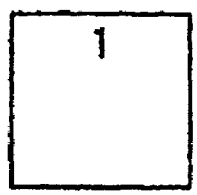
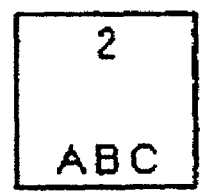
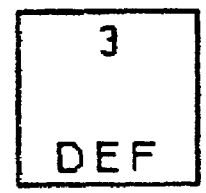
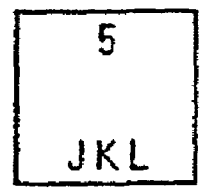
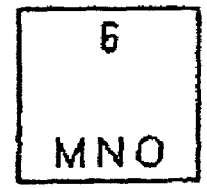
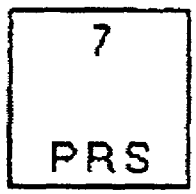
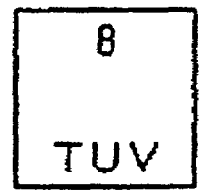
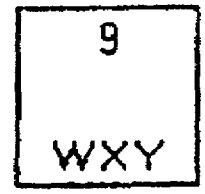
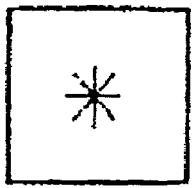
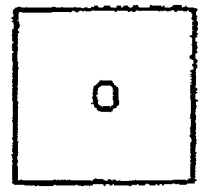
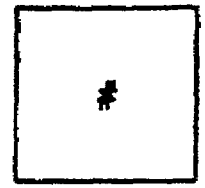

APPARATUS AND METHOD TO GENERATE AND ACCESS BROADCAST INFORMATION

RELATED APPLICATIONS

This is a continuation of application Ser. No. 08/916,099 filed on Aug. 21, 1997 now U.S. Pat. No. 6,314,577, entitled APPARATUS AND METHOD TO GENERATE AND ACCESS BROADCAST INFORMATION, which is a continuation of Ser. No. 08/329,837, filed on Oct. 27, 1994, now U.S. Pat. No. 5,661,787 entitled SYSTEM FOR ON-DEMAND REMOTE ACCESS TO A SELF-GENERATING AUDIO RECORDING, STORAGE, INDEXING AND TRANSACTION SYSTEM. This continuation and the two related applications are incorporated herein by reference as though set out in full.

TECHNICAL FIELD

The present invention relates generally to a method and apparatus to enable a broadcast listener to automatically purchase a music product such as a record album, cassette tape or compact disk without the intervention of an operator after hearing a music piece played on a radio station or music television station. More specifically, the preferred embodiment of the invention utilizes a programmed data processor, a digitally stored audio database containing the names of musical artists and groups, the names of pieces which have been recorded on the musical products, musical excerpts of these pieces, and a telephone system to replay this descriptive information through a telephone connection to a potential purchaser. This method utilizes the program schedule from a local radio station indicating when pieces will be played, a digital recording facility to automatically record excerpts of the music pieces played, a telephone system to decode DTMF tones from a touch tone telephone and an interface to a data communications network for communication with remote databases and computers.

BACKGROUND ART

Radio networks offer the most significant marketing medium for the music industry to create awareness for music titles and artists. But music products such as records, cassettes and compact disks (CDS) are inconvenient to purchase at the time when the consumer has the maximum impulse to buy, after hearing a musical piece on the radio.

Additionally, the inability to automate many of the key functions of a radio based, direct marketing sales operation make it cost prohibitive for a single radio station to establish a direct marketing service linked to the music they broadcast. Station operators offer different programming in each market area making it unsuitable to link their stations into a national music retail network. As well, regulatory limitations curtail the number of stations a radio operator can own in a major market thereby limiting the number of listeners below the critical mass necessary to operate a profitable direct marketing music business.

Radio broadcasters provide no means to fulfill the impulse purchase nature of the radio business. When a radio listener hears a music piece they wish to purchase they must listen for, and remember, the artists name and title of the song. In many instances it is inconvenient to write this information down for future reference. In order to purchase the music product containing the song heard on the radio the consumer must be further motivated to travel to a music store to proceed with the purchase process. At the music store the potential purchaser must determine if the selected music product is in stock and assess the pricing information.

The consumer is further constrained because they are unable to preview the songs on the music product they are considering because the music products are packaged and cannot be played at the store. The potential purchaser must remember and continue to be motivated by the music piece heard on the radio broadcast, possibly from days ago, and hope the other pieces recorded on the album are of sufficient interest to justify the purchase. The inconvenience and inability to sustain the impulse impetus severely impacts the purchase process.

Radio networks are unable to capitalize on the direct marketing opportunities they initiate through impulse music purchases because of the high cost of creating a direct marketing operation. Coordinating and tracking the music aired with the music products to be sold, recording of musical excerpts to be previewed, customer service operations and order fulfillment are all high overhead activities requiring a large dedicated staff with a separate skill set than radio station personnel. The cost for a radio station to establish a direct marketing operation far exceeds the returns from the music selling proceeds derived from a single radio station.

Cable television shopping networks have successfully developed large direct marketing networks based on national coverage by telecasting their programming over many cable companies reaching millions of potential purchasers. Radio station operators are unable to market music products in the same manner because station operators broadcast different music programming in each market preventing the linking of these stations into a common national market.

Radio is the most widely received broadcast medium throughout the world. The problems as previously described have prevented radio networks from being utilized for a mass media, direct marketing, music retail business.

DISCLOSURE OF INVENTION

In view of the foregoing, one objective of this invention is to resolve the problems which inhibit the successful development of a direct marketing music business for the radio industry. In this regard, it should be apparent that there exists a need in the art for a method of operating an automated system which tracks radio audio segments enabling radio broadcast listeners to select, preview and purchase a music product containing the music piece listened to for a radio broadcast.

It is therefore an object of this invention to provide an automated transaction system to record and track radio audio segments enabling a radio listener to use their telephone to recall and preview, on-demand, music pieces previously broadcast thereby assisting the listener in the purchase of a music product such as a record album, cassette or CD. The invention provides the consumer with a timely method to purchase a musical product by supplying all of the required information to conveniently make a music product purchase.

It is another object of the invention to provide a method for an automated transaction system to service multiple radio broadcasts simultaneously, thereby creating a mass radio audience for the direct marketing of music.

These and other objects are achieved by a method of and apparatus for tracking and recording a radio broadcast using a telephone interface connected to a programmed data processor such that when a potential purchaser calls a designated telephone number advertised by the radio station, for example 1-800-RECORDS, a telephone interface provides the listener with the name of the musical artist and the song titles in the reverse order played during the broadcast, starting with the current piece played. The selection, from the current artist played, to the music product the potential purchaser wants to order, is controlled by the potential purchaser using the touch tone telephone keys or voice input. When the potential purchaser reaches the song and artist of interest, further details can be related such as the other songs recorded on the album, pricing, availability and delivery information.

The invention can playback through the telephone, on instructions from the caller, excerpts or the entire song, as broadcast over the radio network, to assist the caller with the purchasing process.

When the potential purchaser indicates they are ready to order, the automated order system obtains the correct name and shipping address by accessing a name and address database responsive to the consumer's telephone number or credit card information. The system also records the consumer's credit card information and obtains credit authorization. The invention then transmits the complete order to the fulfillment warehouse for shipment of the musical product to the purchaser.

It is a further object of this invention to provide a method and apparatus whereby multiple radio stations can be supported simultaneously, offering services on a local, regional or national basis providing the economies of scale and mass audience to support the sales volume necessary to operate a profitable direct marketing service. When a potential purchaser dials the advertised number such as 1-800-RECORDS they are directed by audio prompts to indicate by touch tone entry or voice input the call letters for the radio station to which they are listening. The audio prompts are provided by a telephone interface that is connected to a programmed data processor which performs database functions. The potential purchasers telephone number, input by the caller or supplied by the telephone company's (ANI) Automatic Number Identification service, is compared to all the radio station broadcast coverage zones offered by the participating radio stations. This comparison determines the radio stations within the broadcast range of the caller, providing a limited set of radio stations for the programmed data processor to sort and search based on the callers input of the station call letters. The input of the station call letters enables the programmed data processor to select the correct station program schedule and related information. Thus a large number of radio stations, dispersed locally, regionally, nationally and internationally can be supported by one automated system.

The inventive method also includes the step of efficiently selecting the correct radio station based on touch tone input. Although, each of the telephone keys 2 through 9 have three related alphabetical characters, callers need only to input four telephone key strokes for the four station call letters. The programmed data processor only recognizes the input for the participating radio stations broadcasting in the callers area as determined by the telephone number and broadcast coverage comparison previously described.

It is a further object of this invention to automate the manual and time-consuming functions. The inputting of the radio station play schedule in advance of the broadcast as well as the tracking of the program schedule during the broadcast day requires significant overhead if undertaken manually. As the service expands, and many radio stations are added to the service, the tracking of the various program schedules becomes unmanageable from a manual standpoint.

One component of the method and apparatus of the invention is a system for management of the radio station's program schedule. A radio station's program schedule is produced days and sometimes weeks in advance of broadcast. The program schedule is organized chronologically in the order musical pieces are broadcast and includes information such as the title of the song, the recording artist and group, as well as the day and time the piece is to be broadcast. A radio station broadcasts hundreds of musical pieces each day and the input of the program schedule by an operator is both time-consuming and prone to manual input error. The present invention enables the automation of the program schedule input by utilizing a data communications link and a communications interface such as a facsimile interface to receive the program schedule directly from the radio station into the programmed data processor. The communication interface such as a facsimile board is resident in the programmed data processor and in conjunction with a imaging software, such as a character recognition package, automatically interprets and directly stores the stations program schedule and associated information on a programmed data processor.

The radio station program schedule contains timetable information as well as information describing the music pieces played such as the title, artist and group name. The program schedule is accessed by a audio description creation system which is connected to the programmed data processor. The audio description creation system creates the audio description heard by the caller over the telephone when inquiring about a particular music piece. The audio description information describes the music piece outlined in the program schedule and the music product containing the music piece, along with other related information such as product pricing. The audio description creation system digitally records the audio and is connected to various input devices such as a compact disc player, cassette player, digital audio tape and a microphone. An announcer accesses the program schedule file on a display screen and reads the description information into the microphone creating the audio description file for each music piece. The announcer has access to previous recordings stored in an audio description archive which can be accessed via a data input terminal connected to the audio description creation system enabling previously recorded audio descriptions to be referenced.

It is another object of the invention to automate the recording and storing of the music excerpts for the music pieces outline in the program schedule. These audio segments can be accessed by the potential purchaser to assist in the purchase process and to verify to the caller they are purchasing the music product containing the music piece listened to during the radio broadcast. The automated record and store process is accomplished by inserting a signal such as a tone or pulse at the beginning of each music piece broadcast. A receiver is tuned to the broadcast containing the music pieces to be recorded and a signal detector triggers the digital recording of the piece by the programmed data processor. The music piece is recorded for a specified time such as ten seconds providing an audio segment of the music piece.

Coordination of the audio description file with the program schedule is accomplished through a synchronized time schedule whereby the program schedule file and the recording of the audio segments on the programmed data processor are initiated at the same time. Each station's program schedule is stored in chronological order enabling the coordination. Another method of implementing the signal insertion enables information to be encoded as part of the selection signal and decoded into data for use by a programmed data processor. Information such as the program schedule number or music piece number can be incorporated into the selection signal enabling the coordination of the audio description with the program schedule. Information can be encoded into the selection signal through means such as multiple pulses or combination of tones and pulses.

The invention also provides the information for a potential purchaser to automatically order a music product without having heard one of the pieces through a radio broadcast. For instance when the potential purchaser dials the telephone number a telephone system audibly requests the potential purchaser to touch 1 on their touch tone telephone if they want to order a music piece they have just heard played on the radio, or touch 2 if they want to order a music product from the automated music catalogue. If the potential purchaser touches 2 the invention will then proceed to determine the musical product to be ordered by asking the potential purchaser to select the type of music and to input the artists name or group name using the touch tone telephone keys. Once the correct artist or group is determined the system can reference all the music products performed by that artist or group and provide the potential purchaser with the names of the music album and the recording media available such as CD, record or cassette along with pricing. Further information can also be made available such as the names of the pieces of each piece recorded on each music product along with excerpts to preview each song. The invention conveniently provides all the information required to make a purchase. Some of this information is not available even at the record store.

When the potential purchaser indicates they wish to buy a particular music product the system determines the shipping address and credit authorization and then places the order for the music product with the fulfillment warehouse.

In the case where more than one main artist or group performed on a music product or the purchase process was too complex, the potential purchaser can be bridged to an operator who can obtain and input any required data and assist the caller through the purchase process.

The invention can also be utilized with other broadcast services such as a music television telecast. Viewers of music television program or channel, access the invention in the same manner as previously described but enter the station designation such as call letters, channel number or advertised pseudo-name enabling the invention to recall the pertinent program schedule relating to the viewed television program or channel. The audio portion of the music broadcast, would be recorded and utilized to assist the viewer in the purchasing process. The invention can simultaneously support orders originating from both radio listeners and television viewers.

Other applications of the invention are also possible. The broadcast can consist of content other than music whereby products are advertised within a broadcast and the invention enables listeners to select, preview and purchase items advertised for sale over the network. The audio segments for these products would be recorded in the same manner as previously described for the music pieces and the products would match the program schedule as input prior to the broadcast.

The invention also extends to a digital as well as analog broadcast format whereby the selection signals are digital signals inserted into the digital broadcast.

The foregoing features of the invention, as well as the advantages provided thereby, are explained in greater detail hereinafter with reference to preferred embodiments illustrated in the accompanying drawings.

BRIEF DESCRIPTION OF THE DRAWINGS

FIG. 2 illustrates an example of a Program Schedule reference file;

FIG. 4 illustrates the telephone area and exchange code, station call letter code and touch tone input database file;

FIG. 6 is the touch tone telephone keypad lay out; and

BEST MODE FOR CARRYING OUT THE INVENTION

In order to explain the present invention in detail, reference will be made in particular to FIG. 1.

Figure 1:
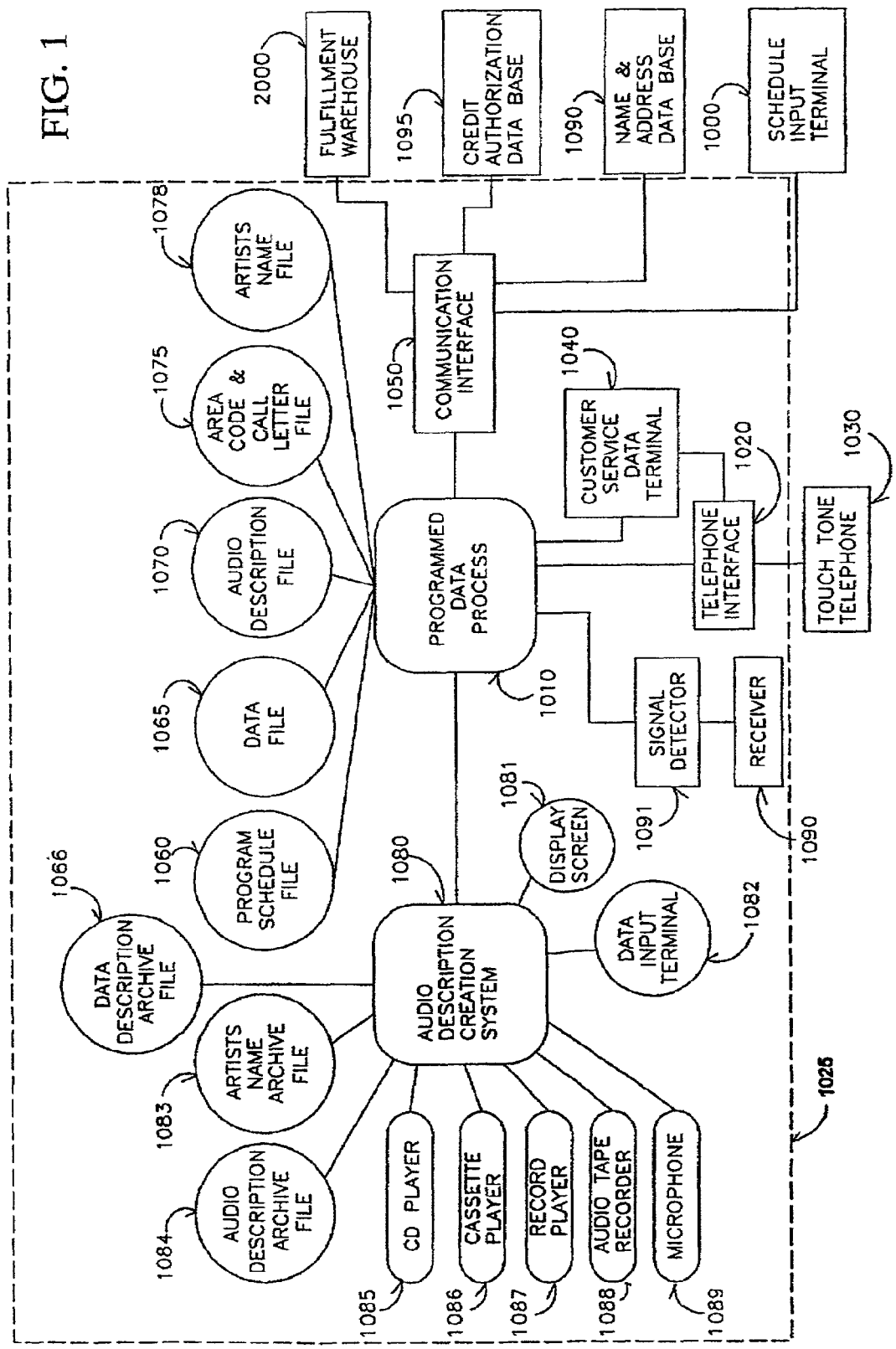
FIG. 1 is a block diagram of the self-generating audio recording, storage, indexing and transaction system according to the present invention.

In FIG. 1, the reference number 1000 designates the radio station schedule input terminal device located at a remote radio station that can communicate with the programmed data processor 1010, located at the central site 1025, and input the program schedule of music to be broadcast on the remote radio station. In the preferred embodiment the radio station schedule input terminal 1000 is the computer system at the radio station that schedules the time of play for both commercials and musical program content. This terminal device 1000 is equipped with a modem and a communications program so that it can automatically dial the communications interface 1050 of the programmed data processor 1010 and input the program schedule including the artists name, name of the musical piece, and the date and time the music is to be played. This information can be coded to reduce the transmission time as there could be hundreds of music pieces broadcast each day.

Alternatively the radio station schedule can be automatically input by FAX (facsimile) using a computer or typewritten print out of the stations program schedule to transmit the stations schedule from the local FAX machine at the radio station to the central site 1025. At the central site 1025, the FAX receiver is a FAX board mounted within either a stand alone personal computer or the programmed data processor 1010 that would sequentially provide each incoming FAX message with its own identification number prior to storing the FAX digitally on the computer systems hard drive. In the process of setting up the FAX call a hand shake protocol is established between the sending and receiving FAX machines such that the receiving FAX machine can determine, by error free data transfer, the telephone number of the transmitting FAX machine. Alternatively, the station's FAX number can be established through, the telephone company supplied, (ANI) Automatic Number Identification service. The programmed data processor 1010 utilizes this telephone number as an index to select the optimal algorithm to convert the FAX images to data. For example, message number 101 assigned by the FAX receiving board is associated with radio station WHAM FM because of the stations digitized telephone number received in the hand shake protocol. The programmed data processor 1010 then accesses the interpretation protocol that matches the FAXed data for WTAM FM to convert the character images sent from the radio station FAX into ASCII characters to be stored on the programmed data processor 1010 in the program schedule file 1060. For example, radio station WTAM FM could utilize a computer printer that produced text in the Roman font. Each line on their schedule begins with time of play, followed by duration, artist name, then the name of the music piece. A different radio station, identified through the handshake protocol by their telephone number as WPAT AM, utilizes a different scheduling computer to print out their program schedule using the Tudor font highlighting the artist name first, followed by the musical piece, time of play and duration. Because the programmed data processor 1010 knows the identity of the sending FAX machine it can apply the optimum algorithm to interpret the text font and determine from the text placement the contents of the page. This approach enables the programmed data processor 1010 to automatically file the FAXed program schedule of the remote radio station in a fixed digital format in the program schedule file 1060 associated with a particular radio station. An example of the format to which the program schedule files are processed is illustrated in FIG. 2.

Alternatively, the terminal device 1000 could be a nonprogrammable terminal connected via a network to the communications interface 1050, interacting on line to input the program schedule. The program schedule data could also be input using a touch tone telephone with voice prompting when connected to the telephone interface 1020 or input by voice into a section of the telephone interface that recognized spoken numbers and words through voice recognition. A coded version of the radio station program schedule makes the input easier and quicker. The schedule data could also be read over the telephone to an operator who would input the data. As this program schedule data is received from all of the participating radio stations it is stored in the program schedule 1060 of the programmed data processor 1010.

Music television channels and other telecasters can also utilize the above-mentioned methods to forward and store their program schedules for use by the system.

The digitized audio description file 1070 is created using the audio description creation system 1080 which is connected to the programmed data processor 1010. The audio description creation system consists of a set of audio input devices, such as a CD player 1085, cassette player 1086, record player 1087, audio tape player 1088 and microphone 1089 for an announcer to record audio descriptions.

The audio description file 1070 consists of the audio description information describing the music piece and an audio segment consisting of an excerpt of the music piece. The audio description information corresponds to the audio recording of the text description of each music piece listed in the program schedule stored in the program schedule file 1060. The announcer uses the display screen 1081 to recall the program schedule from the programmed data processor 1010 for each radio station. As well, additional information concerning the music piece such as the name of the music product containing the music piece and pricing can be input into the creation system via the attached data input terminal 1082 or personal computer and stored on the audio description creation system available to the announcer for audio recording.

For example, the station program schedule, after receipt from a participating radio station, would be loaded onto the audio description creation system 1020. The program schedule file 1060, an example of which is referenced in FIG. 2, contains the station code or identifier for the station 2000, field 1, date and period of the program schedule broadcast 2005 field 2, number of music pieces in the time period 2010 field 3, chronological schedule number 2015 field 4, time of broadcast for a particular music piece 2020 field 5, artist or group name 2025 field 6, title of the music piece 2030 field 7 and the pointer to data file 2035 field 8. Parts of this schedule information can be coded to reduce the transmission time from the radio station to the system. For example, a particular artist or group could be located in a reference table and related to an artist or group number followed by a music piece reference number. The coded entry would be made in the program schedule at the radio station and FAXed to the central site 1025. A standardized reference system could be utilized by all reference table based stations or different tables implemented for each station whereby the station reference table conversion is conducted by the programmed data processor 1010 when the imaging and interpolation process occurs for incoming program schedules.

For the purposes of recording the music title portion of the audio description, the audio description creation system 1080 performs an initial sort of the music pieces listed in the program schedules to remove redundant entries for the same artist and music piece. The artist name 2025 field 6 and the name of the music piece 2030 field 7 contained in the program schedule 1060, or the code representing it, is compared to the data description archive file 1066 containing all previous listings for which audio descriptions already exist. The announcer is then presented, on the display screen 1081, with the listings that require an audio description. The announcer then reads the artist's name and title of the music piece into the microphone 1089 and stores them in the audio description file 1070 while at the same time updating the audio description archive file 1084.

Information not contained in the program schedule such as pricing, album name or other background can be input by the data input terminal 1082, prior to audio recording, and stored as part of the data description archive file 1066 to be included in the audio description by the announcer.

The music product containing the music piece outlined in the program schedule can then be loaded into its respective player such as a CD player 1085, on the audio description creation system 1080 and the audio segment digitized, compressed and stored into its associated audio description file 1070 while also updating the audio description archive file 1084. The audio segment can consist of an excerpt of the music piece or the entire music piece.

The announcer would then depress the space bar or other key of the display terminal 1082 to indicate completion of that audio input and the linking of the entry in the program schedule with the corresponding audio description. The link is made through a database which utilizes the pointer to data file, 2035 field 8, which is added to each music piece in the program schedule and references the corresponding audio and data description.

The announcer can then proceed with the next descriptive item of that musical product which would be displayed on the display screen 1081 for the announcer to record onto the system. This process can be repeated for each piece recorded on the musical product and referenced in the database by product name. Both the audio description archive file 1084 and the data description archive file 1066 are automatically updated with the new entries.

Instead of using a staff announcer's voice to provide the audio description it is possible to have the recording artist provide their own music descriptions on a recording medium such as an audio tape and have it sent to the creation system site to be input and included as part of the audio description via the audio tape recorder 1088.

When the audio descriptions for all of program schedule entries and potentially for all of the new music products have been processed by the audio description creation system 1080, the digital audio description file 1070 on the programmed data processor 1010 is updated with the new audio descriptions contained in the audio description archive file 1084. As well, the data file 1065 is also updated with the new files contained in the data description archive file 1066. The program schedule 1060 is updated with the revised schedule containing the pointer to data file 2035 field 8 linking to the corresponding audio and data description.

Acquiring the music products and manually recording the music pieces is both expensive and time-consuming. The system offers a method for automatically recording the audio segments of the music pieces broadcast. This is accomplished by digitally recording the music in real time directly from the broadcast and storing the recorded segments into the associated audio description file 1070 on the programmed data processor 1010.

In the radio industry, recordable media, such as Digital Audio Tape (DAT) or digital hard drives are used to prerecord many hours of music for preparation and play by radio stations. The music on the digital media is prepared in accordance with a station's program schedule. Existing technology enables an audio signal such as a pulse or DTMF tone to be recorded on the DAT and included with the broadcast to trigger remote audio and video equipment. This capability is commonly used in the radio and television industries to remotely play advertisements.

According to the invention, the automated record and store process is accomplished by inserting a selection signal such as a tone or pulse at the beginning of each music piece to be recorded from the broadcast. In FIG. 1 the receiver 1090 is connected to the signal detector 1091 which is connected to the programmed data processor 1010. The receiver 1090 receives the broadcast containing the music pieces to be recorded and a signal detector 1091, when it detects the appropriate signal, triggers the digital recording of the piece by the programmed data processor 1010. The recording of the music piece continues for a specified time, such as ten seconds, providing an excerpt of each music piece denoted by the selection signal. The digitizing facility can be part of the signal detector 1091 or contained within the programmed data processor 1010.

An additional signal can be included to signal the programmed data processor 1010 to stop recording rather than a timer based approach. Having a signal start and stop the recording function enables the entire music piece to be recorded whereby the additional signal is appended to the end of the music piece.

The real-time recording of the music piece is linked to the program schedule 1060 enabling the recorded audio segment to be stored in the correct audio description file. The recording of the music pieces is initially time synchronized with the program schedule for each station. A receiver 1090 and signal detector 1091 is dedicated to each station requiring real-time recording. Knowing the station code or identifier that the receiver is dedicated to, the programmed data processor 1010 loads the correct program schedule 1060, for the station it is recording, based on the station code 2000 field 1, and the current time and period of broadcast 2005 field 2. The system clock is used by the programmed data processor to locate the current music piece played as indicated in the program schedule, using the time of broadcast 2020 field 5. The incoming audio segment, as detected by the signal detector 1091 is recorded into its corresponding audio description file 1070 as referenced by the pointer to data file 2035 field 8 in its program schedule 1070. After the initial synchronization, the recording of the music pieces into the audio description file 1070 follows in chronological order with the program schedule for that particular station. For example, if synchronization between the incoming audio segments and the current program schedule occurred with the first music piece listed in the program schedule as indicated by the chronological schedule number 2015 field 4, then the next audio segment detected would be recorded into the audio description file corresponding to the next program schedule listing containing the chronological schedule number of two.

When the programmed data processor 1010 reaches the last listing in a program schedule it loads the next schedule for that particular station and proceeds to synchronize and record when the next audio segment is detected. Establishing the last listing in a program schedule can be accomplished in various ways such as comparing the number of music pieces in the time period 2010 field 3 and the chronological schedule number 2015 field 4 for the current listing. If the two fields match the next program schedule is loaded for synchronization with the next incoming audio segment. Another method of detecting the end of a program schedule involves the addition of a delineator at the end of the program listing which when reached causes the loading of the new program schedule As well, a delineator signal can be added to the broadcast signaling the programmed data processor to refer to the next program schedule.

Specific signals or multiple signals can be inserted for various purposes such as to synchronize the program schedule with the automatic recording of the music pieces. When creating the program schedule the station can indicate the time of the synchronizing signal and upon receiving the program schedule, the programmed data processor 1010 automatically interprets the signal placement along with the rest of the program schedule information. Many stations currently utilize a beginning of the hour signal for advertising purposes and this beginning of the hour signal can be detected by the programmed data processor and utilized to synchronize the program schedule.

Another method of implementing the selection signaling enables information to be encoded as part of the inserted signal and converted into data by the signal detector 1091. Information such as a program schedule number or a music piece reference number can be incorporated into the selection signal enabling the coordination of the program schedule 1060 with the recording of the music pieces into the correct audio description file 1070. The selection signal information can be encoded in the inserted signal through various means such as multiple tones or a combination of tones and pulses. For example, when DAT tapes are prepared containing the music for a days broadcast, a signal such as DTMF tones can be inserted prior to each music piece whereby the program schedule number precedes the music piece in the broadcast. For example, the 46th music piece in the program schedule can be preceded by the tones representing a 4 and 6. The signal detector 1091 would detect and decode the signal and pass the information to the programmed data processor 1010. The programmed data processor 1010 would reference the chronological schedule number 2016 field 4, within the current program schedule and record the audio segment into the correct audio description file 1070.

The encoding and inserting of information in the broadcast can be utilized in several ways. A coded music piece reference number indicating the title and artist name can be inserted into the broadcast and received, detected and decoded for use by the programmed data processor 1010 to coordinate the recording of the audio description and synchronization of the program schedule.

In an alternate method of operating the system, the insertion of the music piece reference number enables the system to operate without a program schedule. The insertion of the music piece reference number enables the programmed data processor to go directly to an audio description without accessing a program schedule. If the music piece reference number referred to an audio description not available on the programmed data processor 1010 then the programmed data processor can access the audio description archive file 1084 to retrieve the associated audio description. For operation without a program schedule utilizing the insertion of a music piece reference number, the audio description archive file 1084 can be located on the programmed data processor 1010 to provide more efficient operation.

The selection signal or other information, can be sent as data with the broadcast signal through methods such as the side band frequency of the broadcast signal or as digital data contained within a digital radio transmission or digital television signal.

As well, the selection signal can be utilized to pass messages in real-time to the programmed data processor 1010 such as in the case whereby the disc jockey at the radio station manually inserts a specific signal as part of the broadcast. The signal is decoded by the signal detector 1091 and passed to the programmed data processor 1010, relaying messages such as, a music piece will be skipped and the next music piece in the program schedule will be played enabling the programmed data processor to skip the next listing in the current program schedule.

The real-time insertion of a music piece reference number enables radio stations that conduct live or request radio, to insert the music piece reference number preceding or during the music piece broadcast, enabling the programmed data processor 1010 to locate the corresponding audio description or trigger the recording facility.

The selection signal methodology also applies in the case of a music television channel, music video program or a music station associated with a television telecast such as provided through a cable television telecast, satellite broadcast or television signals distributed via the telephone network. The selection signal is inserted into the audio portion of the signal and detected and potentially decoded as previously described.

An alternate signaling method enables video information to be inserted and detected as the selection signal. In the case of video signaling, the receiver 1090 becomes a television receiver and the signal detector and decoder is a video decoder able to decode the embedded video signal contained within the broadcast.

The audio description archive file 1084 can be updated at the end of the day or recording period by up-loading the audio segments and audio descriptions recorded from the broadcast that do not already exist in the archive. Music pieces, whether prerecorded when the artist name and titles are recorded by the announcer, or real-time recorded from the broadcast, are recorded once and can be referenced in multiple program schedules or multiple times within a given program schedule. Each audio description is filed in the audio description archive file 1084 contained on the audio description creation system 1080. The audio description archive file 1084 enables easy reference and repeated use of the audio descriptions. This is significant from an efficiency standpoint because in most cases a relatively limited number of music pieces receive the majority of the broadcast play.

The audio description creation system 1080 is also the means to create the area code and call letter file 1075, which when located on the programmed data processor 1010, is the basis for determining the call letters of the radio station being listened to by the potential purchaser.

Figure 5:
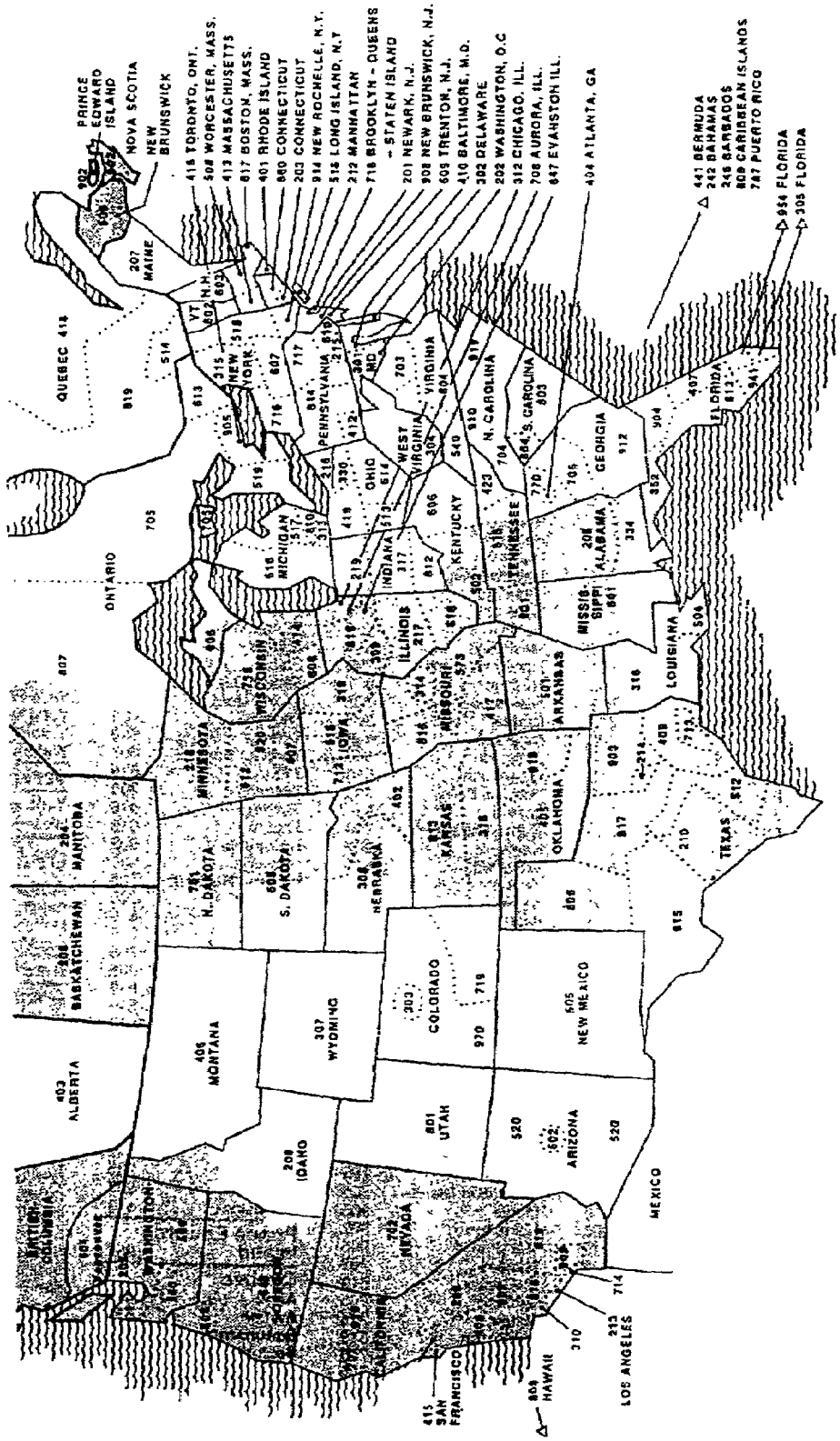
FIG. 5 is a table and map of North American telephone area codes.

For example each of the approximately 130 telephone company area codes, see FIG. 5, have less than 999 unique local exchange codes. Each telephone exchange code defines a small portion of the geographic area of the telephone area code that it is located in, such that a specific exchange code can only exist in one city or town for that particular area code. Similarly, cellular and other wireless telephone services such as PCS (Personal Communications Services) have identification codes relating to cell and transmitter locations with defined geographic limits. Every radio station has an area of signal coverage that is publicly available on maps such that for every exchange code it can be determined which radio stations provide coverage within the boundaries of a particular exchange. For example, in area code 519, exchanges 293, 526, 765, 773, 565, 644, 523, 228, 482, 233, 234, 237, 268, 762, 235, 769, 287, 524, 238, 225, 269, 262, 263, 666, 247, 229, 652, 227, 289, 264, 232, 294, 874, 243, 782, 785, 631, 633, 527, 522, 764, 775, 866, 245, 296, 461, 693, 768, 236 are located in an area surrounding London, Ontario, Canada and these following exchanges are within the London city limits 432, 433, 434, 438, 439, 451, 452, 453, 455, 471, 472, 473, 641, 643, 645, 649, 657, 659, 660, 661, 663, 667, 668, 672, 673, 679, 681, 685, 686 and from these exchanges the following radio stations can be heard CBBL FM, CBCL FM, CIXX FM, CJBC FM, CJBK AM, CJBX FM, CIQM FM, CKSL AM, CFPL AM in London and CHLO AM in St. Thomas and CBEG FM, CHOK AM, CKJD AM, CJFI FM in Sarnia. By organizing this information in a database it is possible to determine from touch tone input, the call letters of the radio station listened to even though the touch tone keys have three alphabetic characters on each key as illustrated in FIG. 6.

The area code and call letter file and database structure are illustrated in FIG. 4 where the area code 4000 and the local exchange digits 4010 are the first two data fields followed by a third field 4020 which indicates the maximum number of radio stations that can be satisfactorily heard in that area and exchange code. A radio station is described in the next set of four fields which are repeated for each radio station. 4030, field 4 contains the numeric values of the touch tone keys that match the letters of the radio stations call letters. For instance WPAT FM would appear as 9728 where the number 9 is contained on the touch tone key corresponding to the letters WXY. 4040 field 5 contains a 0 if the station is AM station or a 1 if FM. 4050 field 6 contains a number 0 to 9 indicating the type of radio station such as country, pop or rock. 4060 field 7 contains a pointer to an audio description of the station call letters so that the potential purchaser can be prompted with the station call letters combined with the type of station in the event the purchaser forgets the call letters. The radio station call letter fields would be arranged in sorted order to improve the speed of the retrieval.

The system would know in advance as part of the database that the first two stations listed in the above example, CBBL FM and CBCL FM have the same touch tone numeric values 22252 and would audibly ask the caller to select the correct station once it detected this conflict.

To determine the radio station call letters the potential purchasers telephone area and exchange code digits are used as a retrieval key against the area code and call letter file 1075 to retrieve the set of radio station call letters that could be heard from that telephone exchange. The potential purchaser is asked to use the telephone to input the station call letters. The call letter numbers from the area code and call letter file 1075 are then compared with the numeric values of the station call letters input by the potential purchaser. If a match is established the system can then proceed to determine which music has been played on the selected radio station. If a match is not found the potential purchaser can be verbally prompted with the types of radio stations in that area code and exchange, for example touch 1 for country, 2 for pop, which when selected, will allow the system to further prompt the potential purchaser with the radio station call letters that match the selected type of station. If this process does not determine the radio station, the potential purchaser can be bridged to a customer service operator, located at a customer service data terminal, 1040 to determine and input the radio station call letters.

As well as station call letters, other identifiers can be utilized in place of or in conjunction with the station call letters, for example, a radio station frequency number, television channel call letters, cable or television station number or advertised station descriptor. This entails an expanded version of the area code and call letter file referenced in FIG. 4 whereby 4030, field 4 includes the touch tone numbers for additional identifiers.

In some cases the station operator may request their own specific telephone number for their listeners to access the service, in which case the called number would identify the station and enable the programmed data processor to recall the appropriate program schedule.

Figure 3:
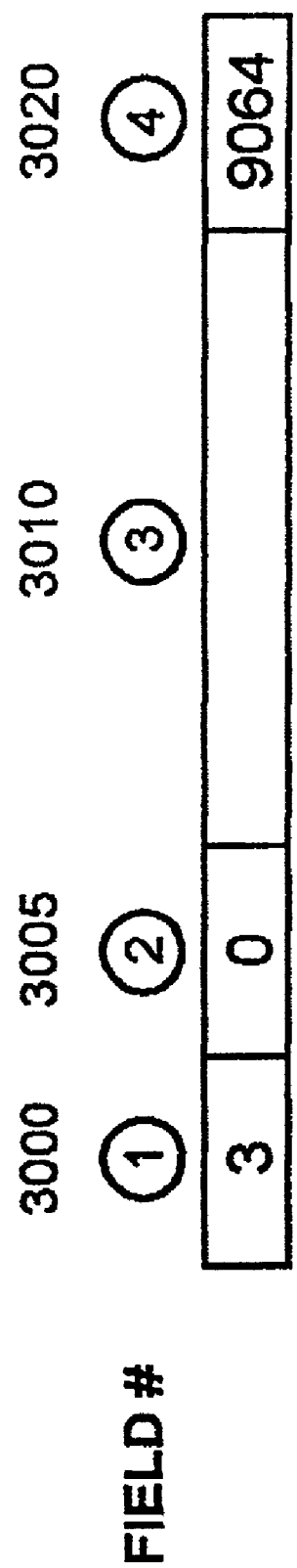
FIG. 3 illustrates an Artist and Group Name reference file.

The audio description creation system 1080 is also the means to create an artist name archive file 1083 which is updated every time a new artist adds a musical product. This artists name archive file 1083 updates the artists name file 1078 on the programmed data processor 1010 each time it is updated. The artists name file 1078 contains the touch tone key combinations and other related information for each artist or group name. This file is also partitioned into as many segments as a potential purchaser can identify as separate sets or styles of music. For example, 5 partitions can be created by dividing all artists or groups into the categories of soft rock, hard rock, pop, easy listening and country. Each of these categories can then be divided into single artists or groups. Then the artist and group names are converted into the numeric values of the touch tone keys that match the alphabetic characters of their names. For example, the letters A, B, C would all be represented by the number 2 which is the numeric value of the touch tone key containing them. A generalized version of this file is described in FIG. 3 where 3000 field 1 contains a number between 1 and 5 representing the type or category of music. 3005 field 2 contains a 0 for an artist or 1 indicating a group. 3010 field 3 contains the name of the artist in touch tone representation of the ASCII characters of their name. Since the characters Q and Z and Space do not appear on the touch tone telephone keypad the number 1 is used to indicate either Q or Z and the number 0 is used to denote a space. The potential purchaser would be informed of these keyboard characteristics when prompted to input the artist or group name. 3020 field 4 would contain a pointer to the artist or group name in the data file 1065 referencing the pointers to all the musical products for the artist or group as well as pointers to the audio description of the artist's name, the names of the artist's musical products, the various pieces included in the musical products and musical excerpts of these pieces contained in the audio description file 1070.

When the updated program schedule 1060, data file 1065, area code and call letter file 1075, artists name file 1078, and audio description file 1070 have been loaded on to the programmed data processor 1010 along with the program to initialize and control the data processor, the system is ready to receive telephone calls ordering music products.

Referencing FIG. 1, the potential purchaser uses a touch tone telephone 1030 to dial an advertised number such as 1-800-RECORDS (equivalent to 1-800-732-6737) to be connected to the telephone interface 1020. The telephone interface 1020 uses audio prompts to ask the potential purchaser to use the touch tone keys to input their telephone number including the area code. Alternatively, this information can be supplied or verified by the telephone company ANI (Automatic Number Identification) service.

After receiving the telephone number the system asks the potential purchaser to touch 1 if they heard the music piece of interest on a radio station, or to touch 2 if they plan to order a music product not recently heard on the radio station.

If the potential purchaser touched 1 the telephone interface 1020 would ask the potential purchaser to input the call letters of the radio station to which they were listening, including AM and FM designations if necessary. Since the basic radio station call letters are four characters and each of the touch tone telephone keys with an alphabetical listing contain three possible characters, the potential for confusion as to which radio station identifier was input is very large. One of the concepts of the invention is to eliminate this confusion by using the caller's telephone area code and the mutually exclusive exchange code digits. This area and exchange code information enables the system to determine which city the call originated from and compare the caller input with a select group of radio station call letters consisting of only the stations participating in the service from that area. The request for the input of AM and FM designations would be requested when an equivalent set of base call letters, such as WPAT FM and WPAT AM, provide a potential conflict.

If the potential purchaser cannot remember the station call letters it is possible to use the area and exchange code digits to retrieve station descriptions from the area code and call letter file 1075 to verbally prompt the user with the call letters only available from their city. This audio prompting could also include general station descriptions such as Country and Western or Rock to help determine the exact station listened to.

Once the system has determined which radio station was listened to, the system can search the program schedule for the selected station to determine the current piece being played and provide the prospective purchaser with the first level of description such as the artist's name. Then the telephone interface directs the potential purchaser to touch 1 if it is the music piece in which they are interested or touch the 2 key to hear an excerpt of the music piece broadcast to confirm the music piece of interest or touch the number key # on their telephone to jump to the previous piece of music played on the broadcast.

With each touch of the number key (#) the system would step back through each piece of music previously broadcast or telecast until the potential purchaser touched 1 to indicate reaching the music piece of interest. Listeners can also, through the telephone, enter the time they listened to a song to speed the retrieve process for those callers that were significantly delayed in calling the service.

Upon reaching the music piece of interest, the system audibly informs the potential purchaser of the formats available for the music product selected, such as CD, cassette tape or record album and provide the pricing, shipping and other details.

The system would then ask the potential purchaser to touch the asterisk key * on the touch tone telephone 1030 if they want to order the music product. Alternatively they can press the number key # if they want more details.

If the potential purchaser touches the number key # the other musical pieces on the product would be described and, if requested, excerpts could be played so that the potential purchaser had all the required information to make the purchase. Pressing the asterisk key * begins the order process.

When the asterisk key * is pressed to order the musical product, the system would use the caller's telephone number to determine the shipping address. The system accomplishes this by requesting the communications interface 1050 to connect to an outside database 1090 to provide the address associated with the caller's telephone number. This address could also be obtained from a local CD ROM, attached to the programmed data processor 1010, that contains the street addresses for the respective telephone numbers. If the caller requests a different shipping address, they can leave a voice message on the audio response system 1025 or be connected to a customer service operator.

As the address retrieval process is proceeding, the telephone interface 1020 audibly requests the purchaser to input their credit card number on the touch tone telephone 1030. The programmed data processor 1010 then directs the communications interface 1050 to contact the credit card issuer 1095 and obtain a credit authorization number which would enable the system to subsequently invoice the customers credit card account upon shipment.

With the shipping address and credit authorization known, the programmed data processor 1010 directs the communications interface 1050 to connect to the fulfillment warehouse 2000 and place the order for the requested music product. If the product is not in stock the fulfillment warehouse computer informs the programmed data processor 1010 through the communications interface 1050 which then instructs the telephone interface 1020 to inform the customer of the out of stock condition.

Once it has been determined that the product is in stock an is placed with all the information to ship the product and create the appropriate records to invoice the purchaser and record the transaction for further accounting and statistical purposes.

In each of these steps, if the caller experiences problems not easily handled by inputting information via the touch tone telephone the caller can be connected through the telephone interface 1020 to a customer service operator, who would obtain the required information verbally for input into the system via the customer service data terminal 1040. The customer service operator has complete control of the session with the caller once the bridge connection has been made. For example, the customer service operator, can over the telephone, play the recorded excerpts for the caller, obtain and enter shipping addresses or explain credit problems. In general the customer service operator is the last resort when the automatic system is unable to complete the order process.

The system will also support orders from callers not directed by a broadcast but interested in purchasing a music product. For example, the potential purchaser can initially, upon calling, be prompted to press the number 2 on their touch tone telephone indicating they were not a radio listener but wished to use the automated music catalogue service whereby the system would proceed to automatically determine the required musical product and provide all the information, including the playing of music excerpts, to enable the potential purchaser to order a selected music album. The system accomplishes this by narrowing the scope of possible music products by first asking the potential purchaser to touch 1 if the artist of group is soft rock, touch 2 if hard rock, touch 3 for blues and touch 4 for country, then to indicate whether the music product is recorded by a group or single artist. Then the telephone interface 1020 requests the artists name followed by a terminator key such as the number key #, to be input using the touch tone keys on the telephone 1030. The type of music and the numeric representation of the artist or group name is combined together as a retrieval key. Matching the retrieval key with the artists name file 1078 provides access to the pointer for the selected artist's name in the data file 1065. The data file 1065 contains a pointer to the artist's name in the audio description file 1070 for the telephone interface 1020 to audibly relate the artist or group name and ask the potential purchaser to confirm the selection of the correct artist or group, using the touch tone keys.

Once the correct artist has been identified the system retrieves the names of musical products for the selected artist stored in the data file 1065 and relates them in the reverse order of their release. These names have pointers to audio descriptions in the audio description file 1070, which when played to the potential purchaser, can assist in determining which musical music product is of interest. By using the touch tone keys, the potential purchaser can hear excerpts from any musical product until satisfied they have all the required information to initiate the purchasing process by touching the asterisk key *. Once the asterisk key * is depressed the system will automatically proceed with the purchase process as previously described.

It is contemplated that a 1-900 telephone number can be used for the service where the potential purchaser would be charged by their telephone company for the telephone call on either a per call or duration basis.

It is further anticipated that record and music clubs can use this invention to assist in describing and selling their products. As well, record stores can use this invention to allow potential customers to hear excerpts from the musical products over telephone lines. These services could be offered from one central site or through smaller local distributed systems networked together.

In both of the above-mentioned examples the music product number or unit code can be used to access the album index of possible pieces to be previewed, thereby reducing the retrieval time to obtain the music information required to make a purchase.

It is further contemplated that specific components of the system can be located remotely and networked to provide a distributed approach to reduce communications costs. For example, the telephone interface 1020 can contain local file storage capabilities and be located remotely from the programmed data processor 1010 such that the telephone interface, and its audible response and preview functions, can be located in major cities.

It is further envisioned that the system may provide support for a variety of terminal devices through the system user interface 7012. For example, a multi-media device such as a personal computer may access the program list information through a digital interface such as the communication interface 1050 thereby enabling access to both audio and text files comprising the program list information. The personal computer communicates utilizing digital data and users select program list information through keypad commands. The user may be guided through the selection process through one of, or a combination of, audio and visual prompts provided through the personal computer.

Further, the system includes support for the addition of video to the program list information whereby the system records, indexes and stores program list information that comprises audio and video content, such as a music video program information recorded from a cable, satellite or digital data network telecast. The video portion of the program list information may be recorded, indexed and stored in conjunction with the audio description in the same manner as previously described. A multi-media terminal device such as a personal computer or interactive television receiver may access the system through the user interface 7012 or such data communication functionality may be provided through the communication interface 1050 providing multi-media descriptions of the program schedule information.

Figure 7:
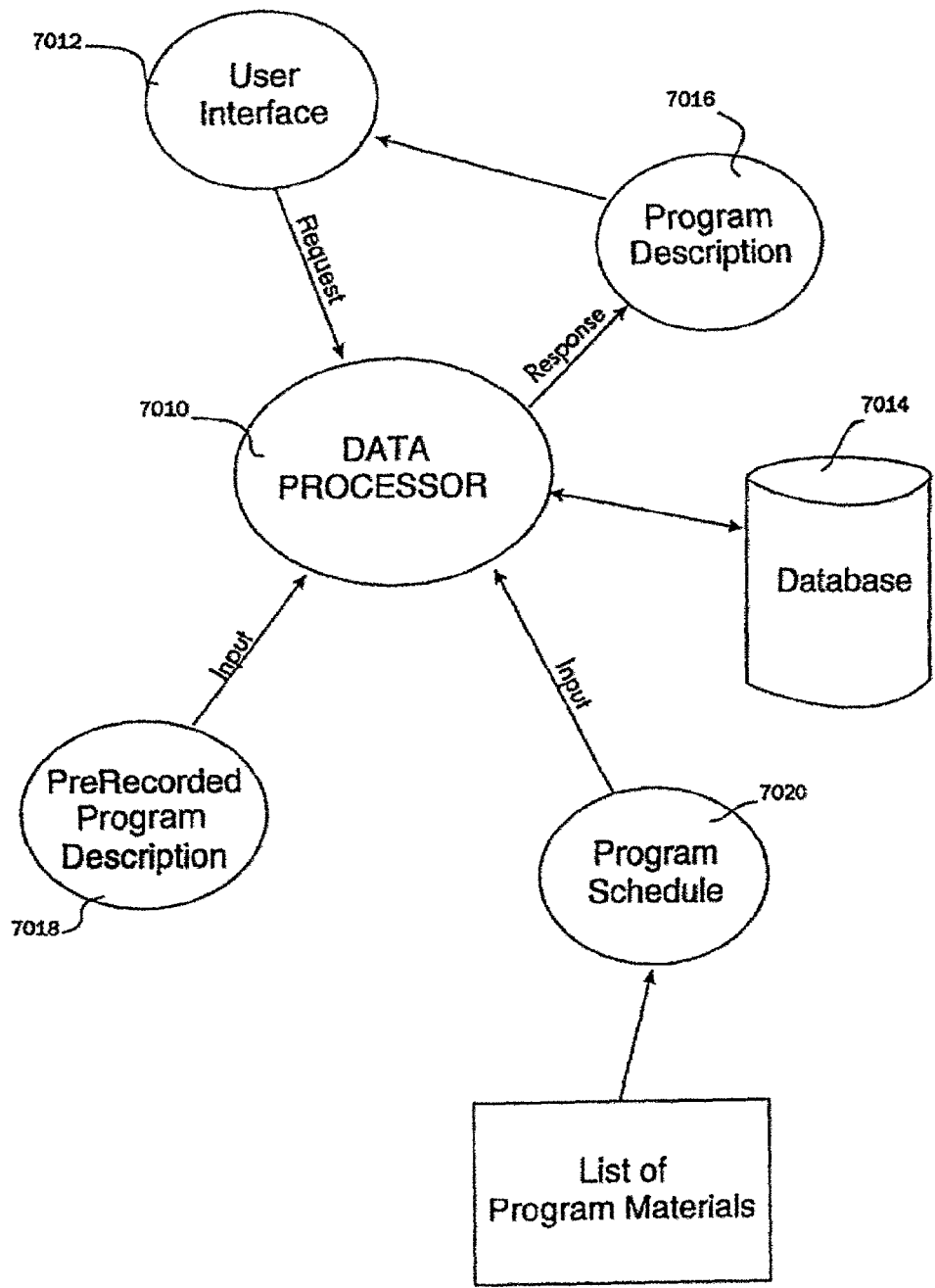
FIG. 7 is an entity relationship diagram illustrating some of the principles of the invention.

Having now described the preferred embodiment of the invention, reference will be made to FIG. 7, which gives an overview of some of the principles of the present invention. As illustrated, the present invention employs data processor 7010 which is provided with a suitable user interface 7012. In the presently preferred embodiment, the user interface is integrated with the existing telephone infrastructure, so that persons may interact with the system using conventional DTMF telephone equipment, as described above. Connected to data processor 7010 is a subsystem 7018 for providing prerecorded program descriptions of the program material (e.g. recorded music) that the caller may wish to purchase. Subsystem 7018 may be implemented using hard disk storage, optical storage, digital audiotape (DAT) storage, or the like. The program material (e.g. recorded music) may be prerecorded from the media played over the air, or it may be prerecorded from the live broadcast using a suitable AM or FM receiver and suitable digitizing (analog to digital conversion) equipment. Also connected to data processor 7010 is a program schedule input system 7020, which may be any suitable means for inputting the program schedule or play list identifying what program materials have been or will be broadcast, including optical character recognition equipment for inputting play lists provided in printed form and telefacsimile equipment for inputting play list information via FAX.

Data processor 7010 is further provided with a database system 7014 for storing the program schedule, suitable data or pointers from which the prerecorded program description may be obtained, reconstructed or generated. A program description subsystem 7016 is coupled to data processor 7010 to provide the selected program description to the user via the user interface 7012. The program description subsystem may include digital to analog conversion equipment for converting digitally pre-recorded program description information into an analog form suitable for distributing serially over the telephone. Alternatively or additionally, the program description subsystem may include synthesis equipment for performing text to speech conversion on text data files representing prerecorded program description information.

While the invention has been described with regard to the presently preferred embodiment, it will be understood that the invention is capable of certain modification without departing from the spirit of the invention as set forth in the appended claims.

What is claimed is:

1. A method for identifying at least one broadcast provider through a combination of a geographic identification code and a broadcast identifier, the method comprising:
   digitally storing, in a database, one or more geographic identification codes that are each associated with at least one area or location in which a broadcast is receivable from at least one broadcast provider;
   digitally storing, in the database, one or more broadcast identifiers that are each associated with at least one broadcast provider;
   receiving at least one user related geographic identification code;
   receiving at least one user related broadcast identifier, wherein the received at least one user related broadcast identifier is not required to by itself identify a broadcast provider;
   determining, by a processor, a subset of data from the database using the received at least one user related geographic identification code, the subset of data comprising at least one of the stored one or more broadcast identifiers that are associated with at least one of the stored one or more geographic identification codes that corresponds to the received at least one user related geographic identification code; and
   identifying, by the processor, at least one broadcast provider using at least both the subset of data and the received at least one user related broadcast identifier, wherein the identifying of the at least one broadcast provider does not require identifying only a closest proximity broadcast provider based on the received at least one user related geographic identification code.

2. The method of claim 1 wherein the at least one user related broadcast identifier is input through a touchtone telephone keypad.

3. The method of claim 2 wherein any number of at least one of the stored one or more broadcast identifiers and the at least one user related broadcast identifier comprise digital data representing telephone keypad numbers corresponding to alphanumeric characters.

4. The method of claim 1, further including determining another subset of data from the subset of data, wherein at least one broadcast is identified from the another subset of data.

5. The method of claim 1, wherein the stored one or more broadcast identifiers are indexed by a category or group listing.

6. The method of claim 1, wherein the database further includes program schedule information for each of at least one broadcast provider, wherein the program schedule information is accessed responsive to the identification of the at least one broadcast provider.

7. The method of claim 1, further including transmitting program description information related to the identified at least one broadcast provider.

8. The method of claim 7, wherein the program description information is transmitted in an order corresponding to a program schedule or list.

9. The method of claim 7, wherein the program description information is located remotely from the database.

10. The method of claim 7, wherein the program description information is determined by using at least one of the stored one or more geographic identification codes and the at least one user related geographic identification code.

11. The method of claim 7, whereby the transmission of the program description information is synchronized with a program schedule or list.

12. The method of claim 1, wherein any number of the at least one of the stored one or more broadcast identifiers and the at least one user related broadcast identifier comprises at least one of provider call letters, a provider tuning frequency, a television channel allocation, a cable subscriber or channel identification, a music genre, a telephone number, a network address, an identification number and a predetermined identifier.

13. The method of claim 1, wherein any number of the at least one of the stored one or more geographic identification codes and the at least one user related geographic identification code comprises at least one of a telephone area and exchange code.

14. The method of claim 1, wherein any number of the stored one or more geographic identification codes and the at least one user related geographic identification code comprises a cable converter address.

15. The method of claim 1, wherein at least one broadcast from the identified at least one broadcast provider comprises at least one of program description information and program schedule information.

16. The method of claim 1, wherein the at least one user related geographic identification code corresponds to an area or region.

17. The method of claim 1, wherein any number of at least one of the stored one or more geographic identification codes and the at least one user related geographic identification code comprises identification codes relating to at least one of a telephone switch, a cellular or wireless transceiver location, and a cellular or wireless cell coverage area.

18. The method of claim 1, wherein any number of at least one of the stored one or more broadcast identifiers and the at least one user related broadcast identifier is associated with at least one of a cable service provider, satellite service provider, an over-the-air broadcast provider, a telephone network provider and a digital data network telecast provider.

19. The method of claim 1, wherein any of the at least one broadcast provider comprises one of a cable service provider, satellite service provider, an over-the-air broadcast provider, a radio broadcast provider, a television broadcast provider, a telephone network provider and a digital data network telecast provider.

20. A method for identifying at least one broadcast provider over a network in response to at least one user communication, wherein the at least one user communication comprises at least one user related broadcast identifier that is not required to by itself identify the at least one broadcast provider, the method comprising:

receiving at least one user related network address associated with at least one user communication;

querying, by a processor, a database of one or more stored network addresses wherein each stored address or part thereof is indexed to one or more stored broadcast identifiers, wherein each of the stored broadcast identifiers is associated with at least one broadcast provider;

determining whether the received at least one user related network address matches at least one of the stored network addresses or parts thereof;

if at least one of said stored network addresses or parts thereof matches the received at least one user related network address, retrieving one or more indexed broadcast identifiers corresponding to the at least one matching network address or part thereof;

receiving said at least one user related broadcast identifier associated with at least one user communication; and identifying, by the processor, at least one broadcast provider using both said retrieved indexed one or more broadcast identifiers and said received at least one user related broadcast identifier, wherein the identifying of the at least one broadcast provider does not require identifying only a closest proximity broadcast provider based on the received at least one network address.

21. The method of claim 20, wherein any number of at least one of the one or more stored broadcast identifiers and the at least one user related broadcast identifier is associated with at least one of a cable service provider, satellite service provider, an over-the-air broadcast provider, a telephone network provider and a digital data network telecast provider.

22. The method of claim 20, wherein any of the at least one broadcast provider comprises one of a cable service provider, satellite service provider, an over-the-air broadcast provider, a radio broadcast provider, a television broadcast provider, a telephone network provider and a digital data network telecast provider.

23. A computer implemented information system for identifying at least one broadcast provider, the system comprising:

a database for storing one or more geographic identification codes that are each associated with at least one of a broadcast area, broadcast range information and a location that each associated with at least one broadcast provider, said database further for storing one or more broadcast identifiers that are each associated with at least one broadcast provider, the stored one or more broadcast identifiers indexed to the stored one or more geographic identification codes;

an input for receiving at least one user related geographic identification code and for receiving at least one user related broadcast identifier, the at least one user related geographic identification code and the at least one user related broadcast identifier associated with at least one user communication, wherein said received at least one user related broadcast identifier is not required to by itself identify a broadcast provider; and a processor comprising an interface and coupled to the database, the processor for determining a subset comprising at least one of the stored one or more broadcast identifiers using the received at least one user related geographic identification code, for receiving at least one user related broadcast identifier and for identifying at least one broadcast provider using at least both the subset and the at least one user related broadcast identifier received by the processor, wherein the identifying of the at least one broadcast provider does not require identifying only a closest proximity broadcast provider based on the received at least one user related geographic identification code.

24. The system of claim 23, wherein the at least one user related geographic identification code and said at least one user related broadcast identifier are associated with separate user communications.

25. The system of claim 23, wherein the database further includes program description information related to at least one broadcast of at least one broadcast provider.

26. The system of claim 25, wherein the program description information is communicated to a user by the interface upon the identification of the at least one broadcast provider.

27. The system of claim 25, wherein the program description information comprises a program schedule or list.

28. The system of claim 25, wherein the program description information comprises information relating to an item in a program schedule or list.

29. The system of claim 25, wherein the program description information is stored remotely from the system.

30. The system of claim 23, wherein any number of at least one of the stored one or more broadcast identifiers and the at least one user related broadcast identifier comprises at least one of provider call letters, a provider tuning frequency, a television channel allocation, a cable subscriber or channel identification, a music genre, a telephone number, a cable converter address, a network address, an identification number and a predetermined identifier.

31. The system of claim 23, wherein any number of at least one of the stored one or more broadcast identifiers and the at least one user related broadcast identifier is associated with at least one of a cable service provider, satellite service provider, an over-the-air broadcast provider, a telephone network provider and a digital data network telecast provider.

32. The system of claim 23, wherein any of the at least one broadcast provider comprises one of a cable service provider, satellite service provider, an over-the-air broadcast provider, a radio broadcast provider, a television broadcast provider, a telephone network provider and a digital data network telecast provider.

33. A method for identifying at least one content provider through a combination of a geographic identification code and a content provider identifier, the method comprising:

digitally storing, in a database, one or more geographic identification codes that are each associated with at least one area or location in which content is receivable from at least one content provider;

digitally storing, in the database, one or more content provider identifiers that are each associated with at least one content provider;

receiving at least one user related geographic identification code;

receiving at least one user related content provider identifier, wherein the received at least one user related content provider identifier is not required to by itself identify a content provider;

determining, by a processor, a subset of data from the database using the received at least one user related geographic identification code, the subset of data comprising at least one of the stored one or more content provider identifiers that are associated with at least one of the stored one or more geographic identification codes that corresponds to the received at least one user related geographic identification code; and identifying, by the processor, at least one content provider using at least both the subset of data and the received at least one user related content provider identifier, wherein the identifying of the at least one content provider does not require identifying only a closest proximity content provider based on the received at least one user related geographic identification code.

34. The method of claim 33, further including transmitting content descriptions related to the content.

35. A method for identifying at least one broadcast provider through a combination of a geographic identification code and a broadcast identifier, the method comprising:

digitally storing, in a database, one or more geographic identification codes that are each associated with at least one area or location in which a broadcast is receivable from at least one broadcast provider;

digitally storing, in the database, one or more broadcast identifiers that are each associated with at least one broadcast provider;

receiving at least one user related geographic identification code;

receiving at least one user related broadcast identifier, wherein the received at least one user related broadcast identifier is not required to by itself identify a broadcast provider;

identifying, by a processor, at least one broadcast provider using at least the database, the received at least one user related geographic identification code and the received at least one user related broadcast identifier, wherein the identifying of the at least one broadcast provider does not require identifying only a closest proximity broadcast provider based on the received at least one user related geographic identification code.

* * * * *